United States Patent [19]

Soulier

[11] 4,298,324
[45] Nov. 3, 1981

[54] APPARATUS FOR MOLDING PARTICULATE EXPANDABLE THERMOPLASTIC RESIN MATERIAL USING MICROWAVE HEATING

[75] Inventor: Joël Soulier, Ivry La Bataille, France

[73] Assignee: Isobox-Barbier, Bannalec, France

[21] Appl. No.: 77,783

[22] Filed: Sep. 21, 1979

Related U.S. Application Data

[63] Continuation of Ser. No. 842,314, Oct. 14, 1977, abandoned.

[30] Foreign Application Priority Data

Sep. 9, 1977 [FR] France ............................ 77 27302

[51] Int. Cl.³ ............................................ B29D 27/00
[52] U.S. Cl. ............................. 425/174.8 E; 249/79; 249/81; 264/26; 264/51; 264/337; 425/4 R; 425/DIG. 13
[58] Field of Search ......... 425/174, 174.8 R, 174.8 E, 425/4 R, DIG. 13; 264/26, 45.6, 25, 51, 337; 249/79, 81

[56] References Cited

U.S. PATENT DOCUMENTS

| | | | |
|---|---|---|---|
| 2,077,927 | 4/1937 | Glenn | 249/79 |
| 2,626,428 | 1/1953 | Bosomworth | 249/78 |
| 3,010,157 | 11/1961 | Cizek | 264/26 |
| 3,193,874 | 7/1965 | Jablonski | 425/174.8 R |
| 3,209,056 | 9/1965 | Jacobs | 264/46.5 X |
| 3,217,362 | 11/1965 | Jacobs | 264/26 X |
| 3,253,064 | 5/1966 | Buonaiuto | 264/46.5 X |
| 3,265,784 | 8/1966 | Jacobs | 264/46.5 |
| 3,289,253 | 12/1966 | Buonaiuto | 264/26 X |
| 3,375,865 | 4/1968 | Boichenko et al. | 249/79 |
| 3,377,653 | 4/1968 | Buonaiuto | 425/174 |
| 3,420,923 | 1/1969 | Ashworth et al. | 264/26 |
| 3,737,266 | 6/1973 | Yamamoto | 264/26 X |
| 4,060,364 | 11/1977 | Gras | 425/174 |
| 4,134,942 | 1/1979 | Mirr et al. | 264/51 X |
| 4,173,608 | 11/1979 | Soulier | 264/26 |

FOREIGN PATENT DOCUMENTS

| | | | |
|---|---|---|---|
| 2149529 | 3/1973 | France. | |
| 1098312 | 1/1968 | United Kingdom | 264/26 |
| 1403392 | 8/1975 | United Kingdom | 264/26 |

OTHER PUBLICATIONS

Lanigan, W. J., "Microwave Curing of Flexible Polyurethane Foam Mouldings", in *British Plastics*, Oct. 1963, pp. 562–565.

"Microwave Power For Fast Curing", Section: Foam Moulding, in *Rubber & Plastics Age*, vol. 44, No. 5, May 1963, p. 525.

*Primary Examiner*—Philip Anderson
*Attorney, Agent, or Firm*—Oblon, Fisher, Spivak, McClelland & Maier

[57] ABSTRACT

Molding of expanded plastic material such as dielectric material by microwave radiation is effected in a mold in which the part of the mold which contacts the material to be molded is of a material having high dielectric losses and capable of absorbing microwave radiation. Such mold portion preferably comprises a resin containing a small amount of carbon black.

18 Claims, 3 Drawing Figures

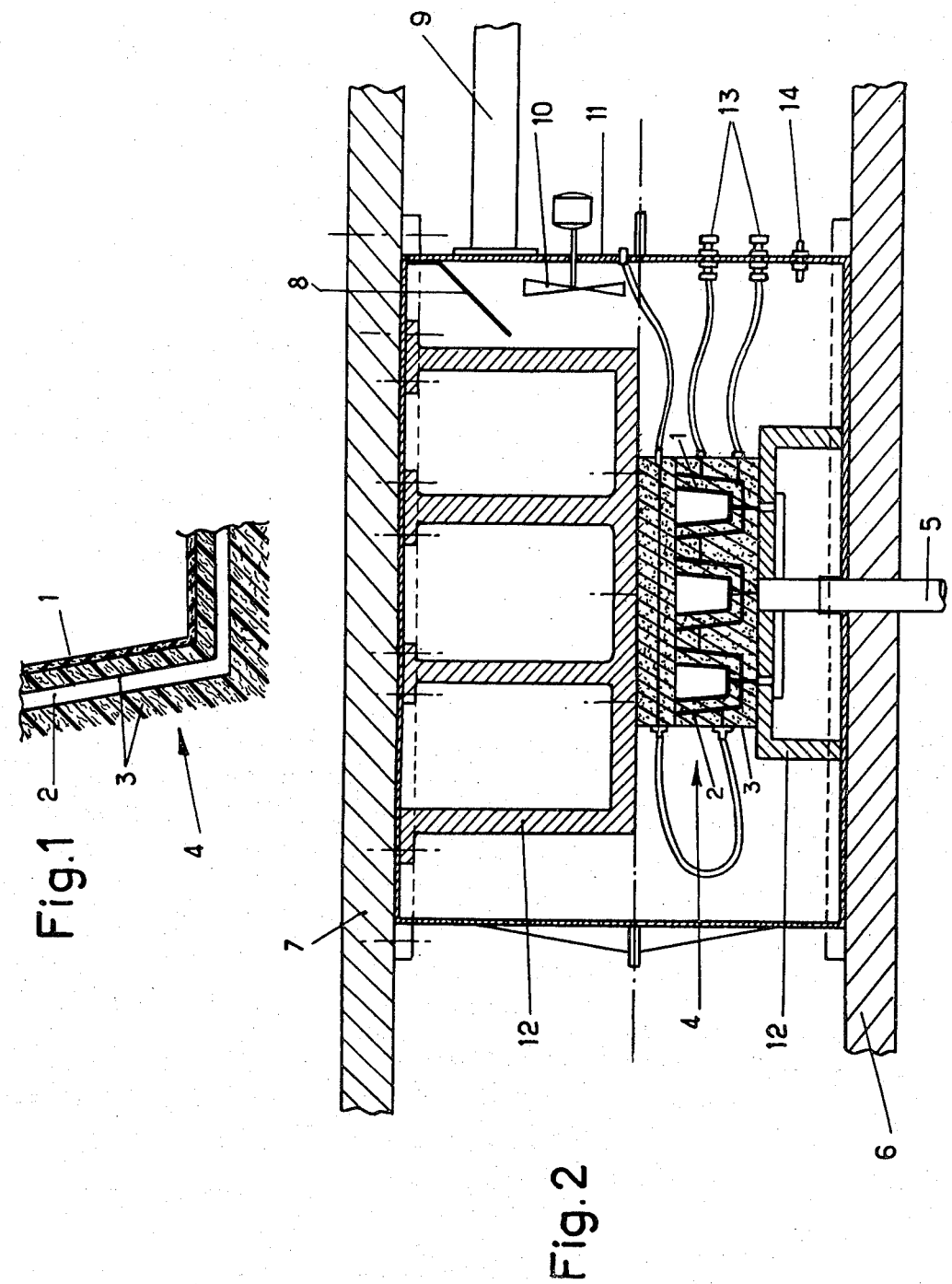

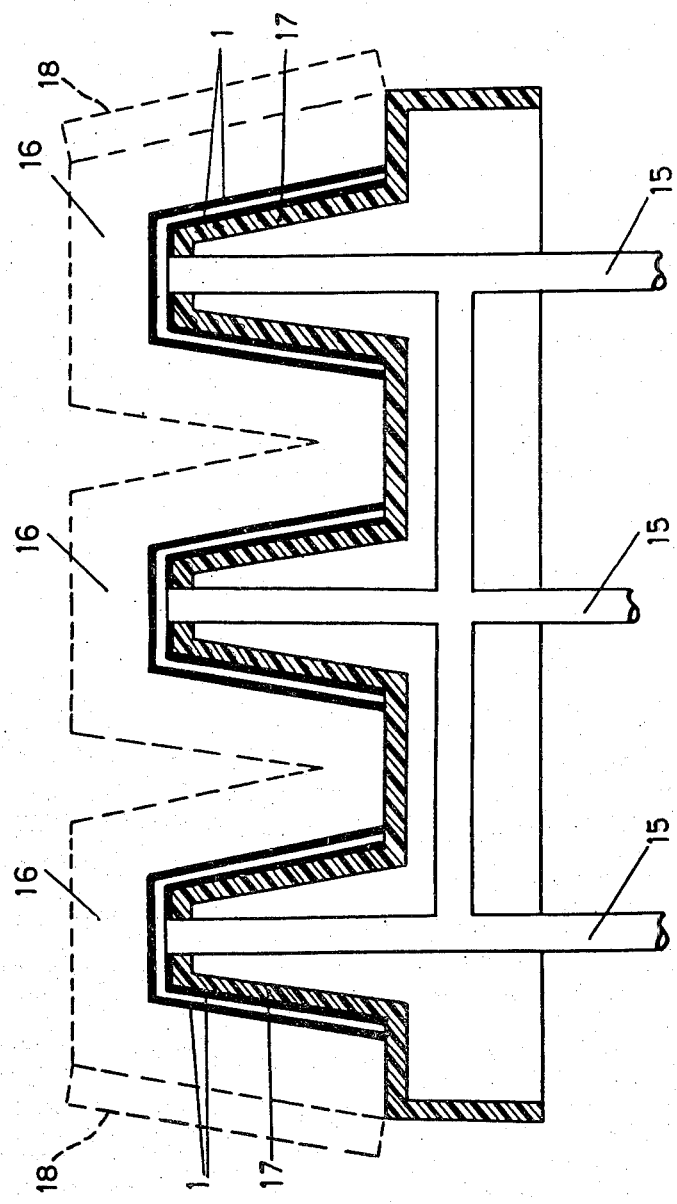

APPARATUS FOR MOLDING PARTICULATE EXPANDABLE THERMOPLASTIC RESIN MATERIAL USING MICROWAVE HEATING

This is a continuation, of application Ser. No. 842,314, filed Oct. 14, 1977 now abandoned.

BACKGROUND OF THE INVENTION

In recent times there has been considerable development and increase in the use of plastic materials for example in the building industry, the refrigerating industry, in the production of unsinkable members e.g. for boats, in packaging and other product conditioning, and the aeronautical and automobile industry. One consequence of this increased use has been a certain amount of progress in improving apparatus and processes for producing expanded plastic material. For example, one step along this route was the use of a high-frequency field to melt the synthetic resin, as disclosed for example in French Pat. Nos. 2 149 529, 1 217 351, 2 045 888 and 2 186 344, and U.S. Pat. No. 3,377,653.

A further improvement lay in the use of ultra-high frequency or microwave radiation (generally 500 to 300,000 MHz) which made it possible to produce plastics foams in an economical manner. This process does not require a capacative circuit and does not cause voltage cracking, the ultra-high frequency (referred to herein as U.H.F.) field energizing a resonant cavity or a resonant waveguide. A process of this nature is disclosed in French Patent applications Nos. 76 01049 and 76 31899 in the name of the assignees of the present application, which set forth an operating procedure of simultaneously introducing beads or pearls of plastic materials which had first been pre-expanded, and water, into a mold disposed in a resonant cavity. This mode of operation produces conditions which permit the formation of vapour in situ, and excellent welding of the beads or pearls to each other, with a good degree of distribution of the heat involved in melting the material.

However, this process suffers from the disadvantage that the molds used are of a material which is transparent to or transmissive of the U.H.F. radiation or wich has a low absorption capacity in respect of such radiation. A consequence of this is a certain lack of uniformity in the heating action and an increase in the amount of power which has to be employed due to the fact that it is necessary to heat the walls of the mold in each molding cycle to achieve heating uniformity. This process therefore not only suffers from poor power efficiency but also tends to suffer from an extended operating cycle due to the need for additional heating of the mold.

SUMMARY OF THE INVENTION

An object of the invention is to provide a mold which better fulfills the practical requirements of microwave molding operation.

A further object of the invention is to provide a mold for molding expanded plastics materials by microwave radiation, which provides an excellent temperature gradient and heat distribution, and which can achieve a substantial saving in the amount of power required for melting the surface of the plastic material in the mold.

According to the present invention, these and other objects are achieved by a mold and a molding apparatus for molding expanded plastic materials, such as dielectric materials, by microwave radiation wherein the part of the mold cavity which contacts the plastic material to be molded comprises a material having high dielectric losses, and capable of absorbing microwave radiation. The material is preferably a resin containing a small amount of microwave radiation-conducting carbon black. The amount of carbon black in the resin is preferably from about 1 to 5%.

The body of the mold may be made of a material which does not absorb microwave radiation, preferably a resin with a filler or reinforcement of fibres of pure silica and/or glass with a low loss angle.

A circuit for the circulation of a heat-exchange fluid is associated with the body of the mold, such fluid preferably having low dielectric losses and a high heat capacity per unit of weight. The heat-exchange fluid circulation circuit is preferably disposed in the body of the mold itself, but the fluid circulation circuit may additionally or alternatively be in the form of a jacket or sleeve assembly on the mold body.

The mold may be cooled by forced air circulation around its outside walls, and such circulation may be achieved by means of blades or vanes on the outside walls of the mold.

Furthermore, the mechanical parts of the mold, such as injectors, vents, or risers, or air-gates and the like can be made e.g. machined of polytetrafluoroethylene (known under the Trade Name of TEFLON) and/or vitroceramics.

In the molding apparatus of the invention, the mold is disposed in a resonant cavity mounted in a press of which one half is fixed and the other half is movable. Such installations are described in the abovequoted French patent applications Nos. 76 01049 and 76 31899. In a preferred form of the apparatus, a portion of the fixed part of the press is excited by a waveguide which is fed by an microwave generator, while the movable part of the press carries the mold assembly. It will be apparent however that the reverse arrangement may be employed without disadvantage.

In the apparatus according to the invention, a minimum distance must be maintained between the mold and the wall of the resonant cavity, and this distance is preferably not less than 65 mm. An electromagnetic field agitating means may be disposed at the outlet of the waveguide into the resonant cavity, the effect of which agitating means is to prevent the formation of standing waves.

A process for molding articles of plastic material in molds in accordance with the invention provides that beads of plastic materials, which may possibly contain a swelling agent or a volatile liquid blowing agent and which may possibly have been pre-expanded before being used in the mold, are introduced into the mold according to the invention, possibly at the same time as a polar liquid such as water. The mold may be a two-part mold, in a suitable form of press. The beads of plastic material in the mold are subjected to the action of microwave radiation for a period of from 5 to 1,800 seconds, in order to produce molded articles of expanded plastic materials having walls of any desired thicknesses, in particular thin-walled articles.

The invention is concerned only with molds for producing expanded plastic material articles as set out above, but other installations, processes and production lines for producing molded articles of expansible plastic material, which include the principles of the present invention, together with the molded articles produced by such molds and installations according to the invention are not excluded.

BRIEF DESCRIPTION OF THE DRAWINGS

Various other objects, features and attendant advantages of the present invention will be more fully appreciated as the same becomes better understood from the following detailed description when considered in connection with the accompaying drawings in which like reference characters designate like or corresponding parts throughout the several views, and wherein:

FIG. 1 is a detail cross-sectional view of part of a mold according to the invention, FIG. 2 is a general diagrammatic view of apparatus for molding articles of expanded plastic materials, including a plurality of molds according to the invention, and FIG. 3 is a diagrammatic cross-sectional view of part of apparatus for producing thin-walled molded articles such as cups.

DESCRIPTION OF THE PREFERRED EMBODIMENTS

Reference will first be made to FIG. 1 which shows a sectional view of part of a mold 4 for molding an expanded plastic material article. The mold 4 has a mold cavity defined at least in part by a wall portion 1 comprising a material which has high dielectric losses and which is capable of absorbing microwave radiation. The wall portion 1 is preferably formed by a surface coating or layer of epoxy resin containing microwave radiation-conducting carbon black (for example "Vulcan XC 72 R" by CABOT). The resin contains a small proportion of carbon black relative to the amount of resin, for example preferably from about 1 to 5% by weight. The wall portion 1 of microwave radiation-absorbing material will generally be provided where the material to be molded comes into contact with the mold, i.e. generally on the whole inside surface defining the mold cavity.

The thickness of the mold wall portion 1 is determined by the desired amount of heat to be applied to the plastic material in the mold, and thus the thickness of the wall of the molded article. It is generally advantageous for the thickness of the coating which forms the mold cavity wall portion 1 to be from about 0.5 to 2 mm, although it may vary according to requirements.

The body 3 of the mold 4 is advantageously made of an epoxy resin with a filler of fibres of pure silica and/or glass with a low loss angle ($tg^\delta \leq 1.10^{-4}$ for a frequency $f = 2.45$ GHz), which does not absorb microwave radiation. The thickness of the silica and/or glass fibre-reinforced resin body 3 of the mold is advantageously from 3 to 5 mm, taking into account the molding pressures which will generally be encountered in operation.

The mold 4 also has means for the circulation of a heat-exchange fluid, including for example a silicone oil as produced by Rhone-Poulenc and known as 47 V 10 RHODORSIL. The fluid-circulation means of the FIG. 1 mold comprises a passage arrangement 2 within the mold body 3, to achieve efficiency in the heat-exchange action, by being adjacent to the wall portion 1 as shown. It will be appreciated however that a passage arrangement for such a heat-exchange fluid circulation may additionally or alternatively be provided in an external jacket or sleeve assembly on the mold body 3, depending inter alia on the nature of the molding operation and the article to be molded.

The heat-exchange fluid preferably has low dielectric loss, and a high heat capacity relative to its weight.

External cooling of the mold may advantageously be effected by means of a forced air draught, for example by mounting blades or vanes on the outside surface of the mold.

Reference will now be made to FIG. 2 which shows a diagrammatic view of an apparatus for molding expanded plastic materials, in particular dielectric materials. This apparatus includes a mold assembly providing a plurality of molds 4 as shown in FIG. 1, and a press having a movable portion of plate 6 and a fixed portion or plate 7. The movable portion 6 may be moved for example by a pneumatic jack, or any other suitable means.

The mold assembly 4 is disposed in a resonant cavity 11 mounted in the press between the two portions 6 and 7 of which the movable portion 6 carries part of the cavity 11 and one part of the two-part mold assembly, providing the mold cavities. The part of the cavity 11 on the fixed portion 7 of the press is connected to a microwave waveguide 9 which is fed by a microwave generator (not shown), to energize or excite the portion 7.

The two parts of the mold assembly 4 disposed in the resonant cavity 11, as shown clearly in FIG. 2, are supported on respective support assembly 12, and it will be understood that the support assemblies 12 are also effective to provide an adjustment in respect of the position of the molds 4, relative to the movable part 6 of the press, to ensure proper closure thereof.

Mounted within the resonant cavity 11 adjacent to the outlet end opening of the microwave waveguide 9 is a means 10, shown as a rotary blade assembly driven by a motor, for agitating the microwave field, to thereby prevent the formation of stationary or standing waves. Disposed adjacent to the field agitating means 10 is a deflector 8 illustrated as a plate inclined downwardly towards the means 10 which is disposed below the waveguide 9 outlet, to direct the waves towards the means 10 thereby to enhance the efficiency of the agitation action.

The apparatus of FIG. 2 also has an injector 5 which is in communication with the mold cavities of the molds 4, for injecting into the mold cavities plastic material in bead or pearl form, which may have been subjected to a pre-expansion operation before being injected and which may possibly contain the swelling agent or volatile liquid blowing agent. The injector 5 is preferably made of a material having low dielectric losses.

The molds 4 and the wall of the resonant cavity 11 must be spaced from each other by a given minimum distance, and it has been found that this minimum distance is advantageously about 65 mm.

Still referring to FIG. 2, reference numeral 13 denotes flow means for introducing a heat-exchange fluid which is to circulate in the internal passage arrangement 2 of the molds 4 and/or in the external jacket or sleeve assembly, where employed, as mentioned in relation to FIG. 1. The flow means 13 are preferably also made of a material with low dielectric losses. Reference numeral 14 denotes flow means for a flow of e.g. compressed air, which is provided for ejecting the molded articles, the means 14 also preferably comprising a material with low dielectric losses. Additionally, the flow means 14 may also be used to direct a stream of compressed air over the mold for cooling by forced air circulation.

It should be noted here that the apparatus of FIG. 2 may be used for molding any expansible plastic material, non-limiting examples of which include expansible polystyrene, polyethylene and polyurethane.

Reference will now be made to FIG. 3 which shows a non-limiting example of use of the mold according to the invention, for producing articles with thin walls, illustrated in the form of beakers or cups. Beads or pearls of expansible plastic materials are introduced by an injector assembly 15 into the mold cavities. Each mold is in two parts, a female part 16 and a male part 17, and the inside surfaces which define the mold cavities are provided with surface coatings to form the wall portions 1. The surface coatings 1 are of a material with high dielectric loss and capable of absorbing microwave reduction, as described above with reference to FIG. 1. As in the FIG. 2 apparatus, the mold assembly of FIG. 3 is disposed in a press within a resonant cavity to which microwave radiation is fed.

In the arrangement shown in FIG. 3, the high-loss, radiation-absorbent wall portions 1 of the molds are about 0.8 mm in thickness. When the mold cavities are also to be supplied with polar liquid, for example water, at the same time as the plastic material is to be introduced into the mold cavities, this liquid injection operation may be effected by movable injectors (not shown). It will be noted that the operation of molding plastic materials according to the present invention can be effected without introducing a polar liquid, when molding thin-walled articles. The mold is cooled by convection of forced air draught, which can advantageously also be introduced by movable injectors (also not shown in FIG. 3). Blades or vanes 18 may be mounted on the outside surface of the mold to aid cooling.

By way of example only, with an apparatus comprising eight mold assemblies mounted in a carrousel arrangement and each comprising six mold cavities, operated in a molding cycle of a duration of 45 seconds, it is possible to produce 3,840 cups per hour, each cup weighing about 2 grams, for 7.6 kg of input material for molding. The total microwave power consumption of the press plus the pre-expansion arrangement is about 2.5 kw.

In operation of the above-described apparatus, bead or pearls of plastic materials are introduced into molds 4 (FIGS. 1 and 2) or 16, 17 (FIG. 3). The plastic materials may contain a swelling agent and it may have been subjected to a pre-expansion action before being introduced into the mold cavity. The plastic material may be introduced simultaneously with a polar liquid, for example water, to cause the formation of vapour in situ, which is required for welding the beads of plastic material together. When microwave radiation is introduced into the resonant cavity 11, the wall part 1 of the mold which is in contact with the beads of plastic material, such part 1 being made as mentoned above of a material having relatively high dielectric losses, absorbs a part of the microwave energy and applies it in the form of heat by heat conduction to the plastic material contained in the mold cavity or cavities. In this way the apparatus provides for good heat distribution.

The material in the mold may be subjected to microwave radiation for a period of e.g. from 5 to 1,800 seconds, to produce the molded article.

Accordingly, as the mold cavity wall is capable of absorbing microwave radiation, it can avoid the formation of vapour condensate on the walls. This fact, together with the fact that the mold cavity wall portions are very thin and absorb microwave radiation, can shorten the mold cooling cycle, and also provide a considerable saving in regard to the power used.

Furthermore, molds according to the invention can be of very low industrial cost price, as they can be made by a simple casting operation, and an apparatus of the carrousel type can often produce approximately twice as much for the same cost price (i.e. equipment and mold), relative to conventional prior art processes which employ a steam boiler and a machined mold. Mechanical parts of the mold such as injectors or vent means may be made of polytetrafluoroethylene and/or vitroceramics.

Yet another advantage of the apparatus is that it can provide for a considerable reduction in the time required for changing the mold, by virtue of the simplicity of its construction. The apparatus also makes it possible to mold thin-walled articles of high quality, by a process referred to as a "dry wall process", i.e. without using a polar liquid in the mold.

It will be understood that the invention has been described above with reference to embodiments which are given only by way of example, and that various modifications and variations may be made within the scope and spirit of the present invention.

What is claimed as new and desired to be secured by Letters Patent of the United States is:

1. A device for molding particulate expansible plastic dielectric material by microwave radiation, which comprises:
a mold body, in combination with a press and a resonant cavity having wall members wherein the mold body includes a first portion comprising wall surfaces which define the mold cavity and which contact said plastic material to be molded said portion being formed of a resin containing microwave radiation-conducting carbon black which has high dielectric losses and which is microwave-absorbent and wherein the remaining portion of the mold body is made of a material which is essentially transparent to or transmissive of microwave radiation; and
means for applying microwave radiation to said mold body.

2. The device of claim 1 wherein said resin contains microwave radiation-conducting carbon black in a proportion of from about 1 to 5% by weight of said resin.

3. The device of claim 1 wherein said remainder of the mold body material comprises a resin with a filler or fibres of pure silica, having a low loss angle.

4. The device of claim 1 wherein said remainder of the mold body material comprises a resin with a glass fibre filler.

5. The device of claim 1 wherein said remainder of the mold body comprises a resin with a filler of pure silica and glass fibres.

6. The device of claim 1 wherein said fluid circulation means is located in the mold body.

7. A mold assembly for molding particulate expansible plastic dielectric material by microwave radiation which comprises:
a mold body, in combination with a press and a resonant cavity having wall members wherein the mold body includes a first portion comprising wall surfaces which define the mold cavity and which contact the material to be molded said portion being formed of a resin containing microwave radiation-conducting carbon black which has high dielectric losses and which is microwave-absorbent and wherein the remaining portion of mold body is made of a material which is essentially transparent to or transmissive of microwave radiation;

means for applying microwave radiation to said mold body; and means disposed within and connected to said resonant cavity wall members for circulation of heat-exchange fluid, in operative association with the mold body.

8. The mold assembly of claim 7 wherein said microwave-absorbent carbon black is from about 1 to 5% by weight of said resin.

9. An apparatus for molding particulate expansible plastic dielectric material by microwave radiation, the apparatus comprising:

a press;

a resonant cavity, having wall members, formed within the press, at least one mold body within the resonant cavity, wherein the mold body includes a first portion comprising wall surfaces which define the mold cavity and which contact said plastic material to be molded said portion being formed of resin containing microwave radiation-conducting carbon black which has a high dielectric loss and which is microwave-absorbent and wherein the remaining portion of the mold body is made of material which is essentially transparent to or transmissive of microwave radiation; and means for applying microwave radiation to said mold body.

10. The apparatus of claim 9 wherein said resin contains microwave radiation conducting carbon black in a proportion of from about 1 to 5% by weight of said resin.

11. The apparatus of claim 9 wherein said remainder of the mold body material comprises a resin containing a filler of pure silica fibres.

12. The apparatus of claim 9 wherein said remainder of the mold body material comprises a resin with a glass fibre filler.

13. The apparatus of claim 9 which further comprises an electromagnetic field agitating means disposed in the resonant cavity operatively adjacent to the outlet of the waveguide thereinto, thereby to prevent the formation of standing waves therein.

14. The apparatus of claim 13 further comprising deflector means wherein said agitating means is cooperable with said deflector means for deflecting the microwave radiation into the resonant cavity adjacent said agitating means.

15. The mold assembly of claim 7, wherein said remainder of the mold body material comprises a resin with a filler of fibres of pure silica, having a low loss angle.

16. The mold assembly of claim 7, wherein said remainder of the mold body material comprises a resin with a glass fibre filler.

17. The mold assembly of claim 7, wherein said remainder of the mold body material comprises a resin with a filler of pure silica and glass fibres.

18. The apparatus of claim 9, wherein said remainder of the mold body material comprises a resin with a filler of pure silica and glass fibres.

* * * * *